United States Patent
Awada et al.

(10) Patent No.: US 7,275,185 B2
(45) Date of Patent: Sep. 25, 2007

(54) METHOD AND APPARATUS FOR DEVICE ERROR LOG PERSISTENCE IN A LOGICAL PARTITIONED DATA PROCESSING SYSTEM

(75) Inventors: Faisal M. Awada, Round Rock, TX (US); Joe Nathan Brown, Austin, TX (US); Philip Bernard Burkes, Round Rock, TX (US); Victor Espinoza, Jr., Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 10/718,061

(22) Filed: Nov. 20, 2003

(65) Prior Publication Data
US 2005/0138479 A1 Jun. 23, 2005

(51) Int. Cl.
*G06F 11/00* (2006.01)
(52) U.S. Cl. .............................. 714/47; 714/15; 714/20
(58) Field of Classification Search .................. 714/13, 714/15, 19, 20, 38, 45, 47
See application file for complete search history.

(56) References Cited

U.S. PATENT DOCUMENTS

| | | | |
|---|---|---|---|
| 6,353,898 B1* | 3/2002 | Wipfel et al. .................. 714/48 |
| 6,802,025 B1* | 10/2004 | Thomas et al. ................ 714/15 |
| 7,036,044 B1* | 4/2006 | Verma et al. .................. 714/19 |
| 7,131,030 B2* | 10/2006 | Gilstrap et al. ............... 714/47 |
| 2004/0210800 A1* | 10/2004 | Ghislain Gabriel Vecoven et al. ........................... 714/47 |

* cited by examiner

*Primary Examiner*—Robert Beausoliel
*Assistant Examiner*—Joseph D Manoskey
(74) *Attorney, Agent, or Firm*—Duke W. Yee; Diana R. Gerhardt; Theodore D. Fay, III (57) ABSTRACT

A method, apparatus, and computer instructions for managing event information in a logical partitioned data processing system. A determination is made as to whether an event for a resource is present in a first event log in a first partition in response to reallocation of the resource from the first partition to a second partition. In response to the event being present, the event is placed in a second event log in the second partition. As a result, analysis of the second event log in the second partition takes into account the event from the first partition.

19 Claims, 5 Drawing Sheets

FIG. 1
100 DATA PROCESSING SYSTEM

METHOD AND APPARATUS FOR DEVICE ERROR LOG PERSISTENCE IN A LOGICAL PARTITIONED DATA PROCESSING SYSTEM

BACKGROUND OF THE INVENTION

1. Technical Field

The present invention relates generally to an improved data processing system and in particular to a method and apparatus for managing data in a data processing system. Still more particularly, the present invention relates to a method and apparatus for managing error logs in a logical partitioned data processing system.

2. Description of Related Art

Increasingly large symmetric multi-processor data processing systems, such as IBM eServer P690, available from International Business Machines Corporation, DHP9000 Superdome Enterprise Server, available from Hewlett-Packard Company, and the Sunfire 15K server, available from Sun Microsystems, Inc. are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocatable resources include one or more architecturally distinct processors with their interrupt management area, regions of system memory, and input/output (I/O) adapter bus slots. The partition's resources are represented by the platform's firmware to the operating system image.

Each distinct operation system or image of an operating system running within a platform is protected from each other such that software errors on one logical partition cannot affect the correct operations of any of the other partitions. This protection is provided by allocating a disjointed set of platform resources to be directly managed by each operating system image and by providing mechanisms for insuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocatable resources within the platform.

With respect to hardware resources in a logical partitioned data processing system, these resources are disjointly shared among various partitions. These resources may include, for example, input/output (I/O) adapters, memory DIMMs, non-volatile random access memory (NVRAM), and hard disk drives. Each partition within an LPAR data processing system may be booted and shut down over and over without having to power-cycle the entire data processing system.

Each of these partitions contains an error log. An error log provides information on the status and behavior of devices over time. In a logically partitioned system, devices sometimes may be dynamically moved between partitions. Partitions normally do not share resources and are completely autonomous. When a resource is moved between partitions, any error log entries pertaining to the resource that exists in the former partition remain in that partition. New entries are made for the resource in the new partition.

Many diagnostics processes perform error log analysis based on thresholding of certain types of errors over a given period of time. The old entries for the resource in the prior partition are not accessible from the current partition by the diagnostics process. As a result, it is possible that a diagnostics process will not fail a resource, warn of an imminent failure of a resource, or provide informational messages relative to the resource in the new partition based on the entries found in the new partition.

The present invention recognizes that this behavior is due to the fact that the device has not reached the failure threshold in the new partition.

Therefore, it would be advantageous to have an improved method, apparatus, and computer instructions for managing error log entries in a logical partitioned data processing system.

SUMMARY OF THE INVENTION

The present invention provides a method, apparatus, and computer instructions for managing event information in a logical partitioned data processing system. A determination is made as to whether an event for a resource is present in a first event log in a first partition in response to reallocation of the resource from the first partition to a second partition. In response to the event being present, the event is placed in a second event log in the second partition. As a result, analysis of the second event log in the second partition takes into account the event from the first partition.

BRIEF DESCRIPTION OF THE DRAWINGS

The novel features believed characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
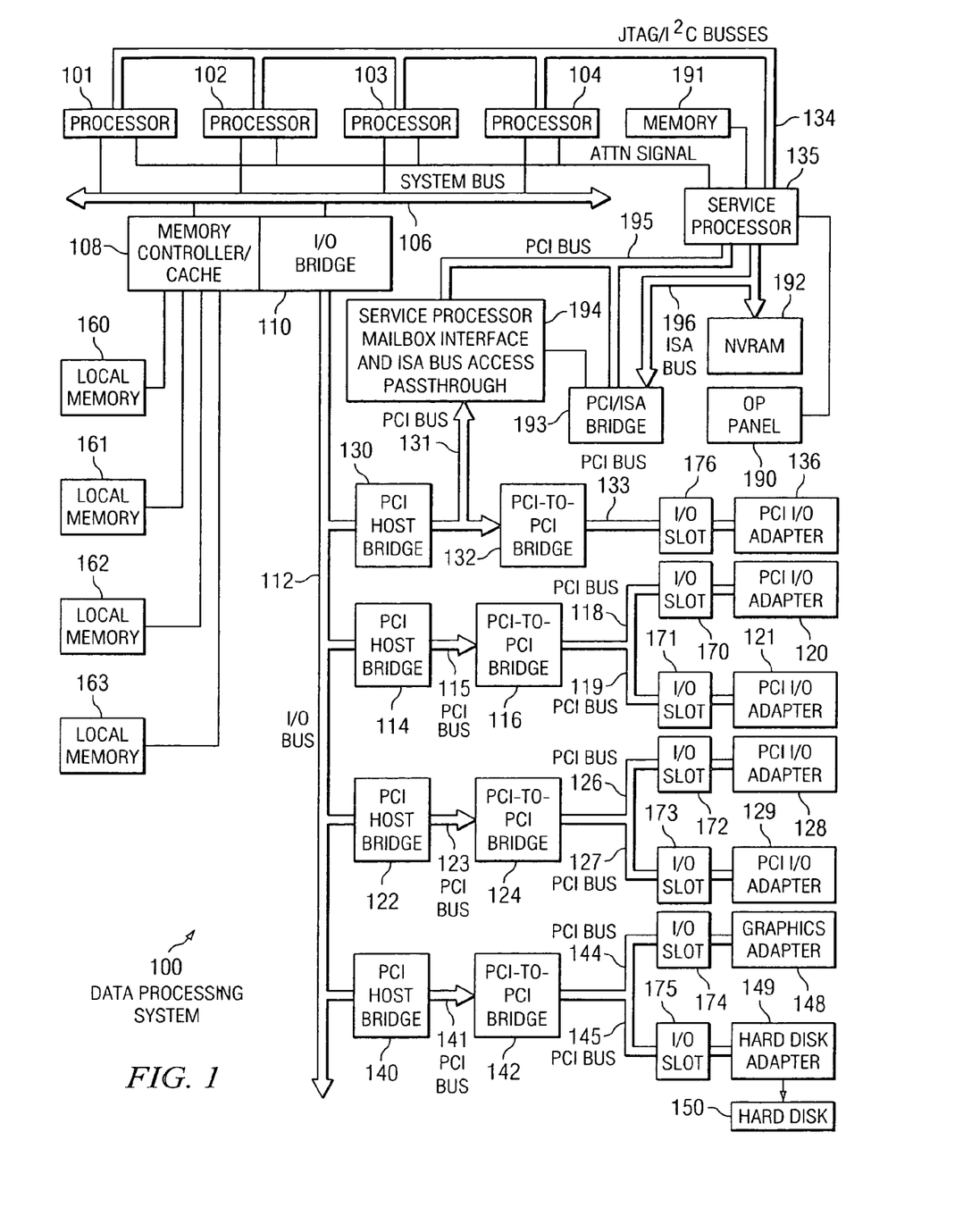
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106.

For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P3. Windows XP is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future initial program loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using. an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
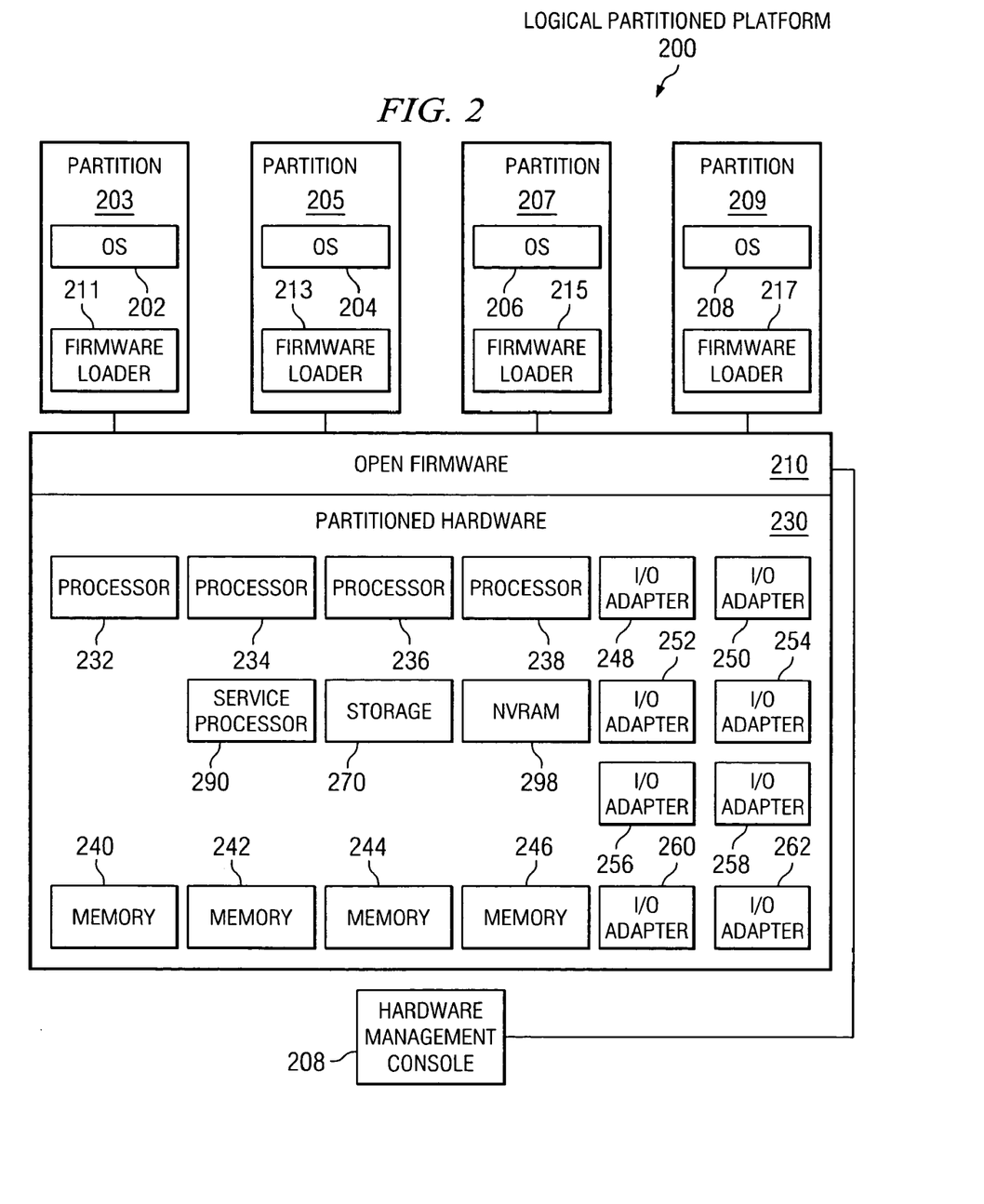
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209.

Additionally, these partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the hypervisor's partition manager. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Partitioned hardware 230 also includes service processor 290, which may be used to provide various services, such as processing of errors in the partitions. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, hypervisor 210 allows the simultaneous execution of independent OS images 202, 204, 206, and 208 by virtualizing all the hardware resources of logical partitioned platform 200.

Operations of the different partitions may be controlled through a hardware management console, such as hardware management console 280. Hardware management console 280 is a separate data processing system from which a system administrator may perform various functions including reallocation of resources to different partitions. Hardware management console 280 also is a component in which the mechanism of the present invention may be implemented. Management processes within hardware management console 280 may be used to transfer events recorded in event log for a resource within a partition to another event log in a second partition in response to movement or reallocation to the resource of the second partition. Such a mechanism allows for persistence in events between different partitions.

Figure 3:
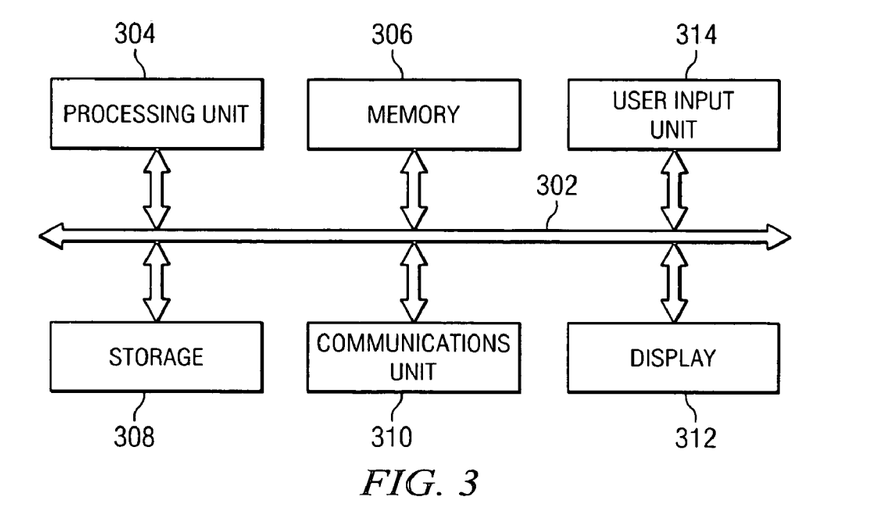
FIG. 3 is a block diagram illustrating components in a hardware management console in accordance with a preferred embodiment of the present invention.

Turning next to FIG. 3, a block diagram illustrating components in a hardware management console is depicted in accordance with a preferred embodiment of the present invention. Hardware management console 300 may be implemented as hardware management console 280 in FIG. 2. In this illustrative example, hardware management console 300 includes an interconnect fabric in the form of system bus 302 which interconnects various components within hardware management console 300.

Components, such as processing unit 304, memory 306, storage 308, communications unit 310, display 312, and user input unit 314 are connected to system bus 302. Processing unit 304 provides the logic for executing instructions to perform processes including error log management when devices are dynamically moved between partitions. Memory 306 contains instructions executed by processing unit 304 as well as data. Storage 308 provides for long-term storage of data and programs including those containing processes of the present invention. In the illustrative examples, these processes include moving errors or events logged in an event log for a device in a first partition to an event log in a second partition when the device is moved to the second partition. In this manner, diagnostics processes and administrators may have a more complete view of the event history for a device in analyzing the device for a potential failure in the illustrative examples.

Communications unit 310 provides an interface to communicate with a logical partitioned data processing system, such as logical partitioned data processing system 200 in FIG. 2. Display 312 provides an output to present information to a user. User input unit 314 allows a user to enter commands through devices such as a mouse and keyboard.

Figure 4A:
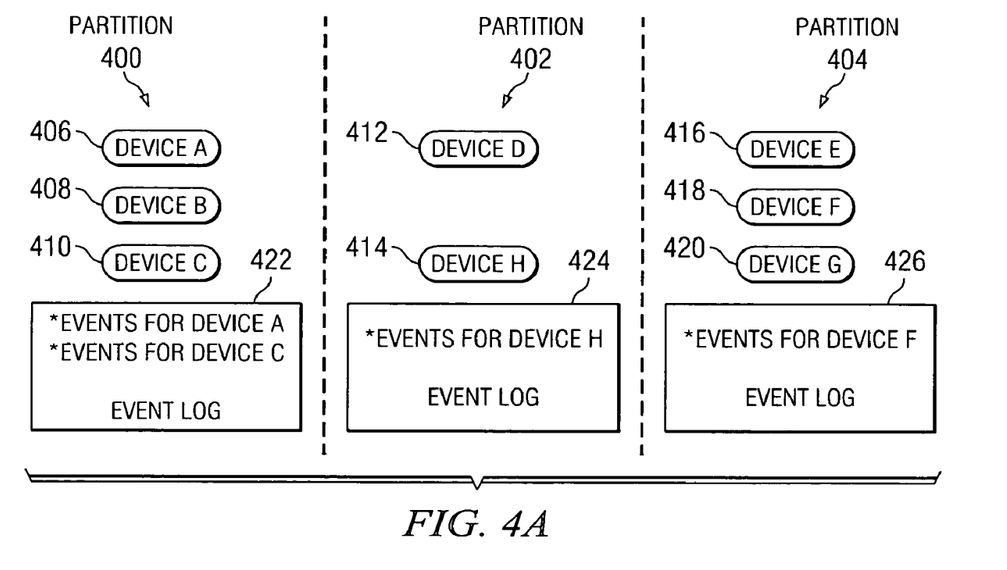
FIGS. 4A-4C are diagrams illustrating handling of events for devices in a logical partitioned data processing system in accordance with a preferred embodiment of the present invention.
Figure 4B:
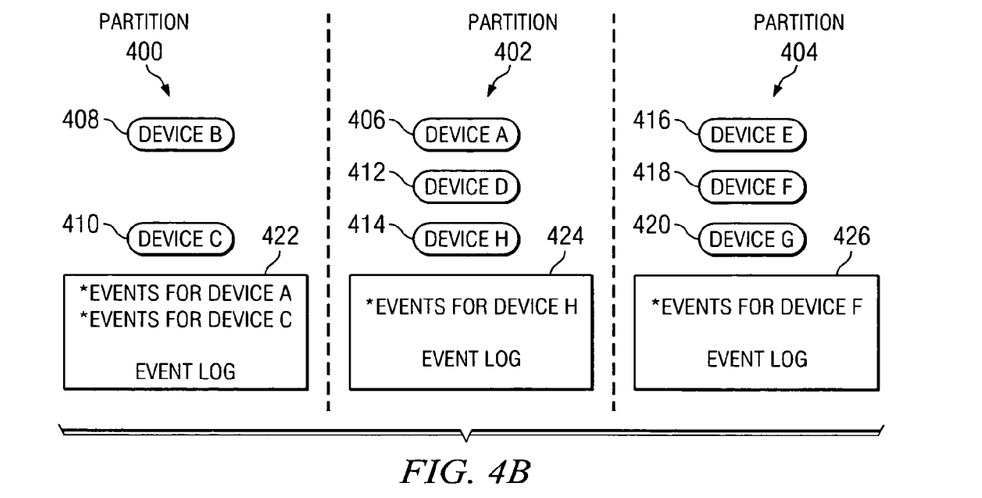
Figure 4C:
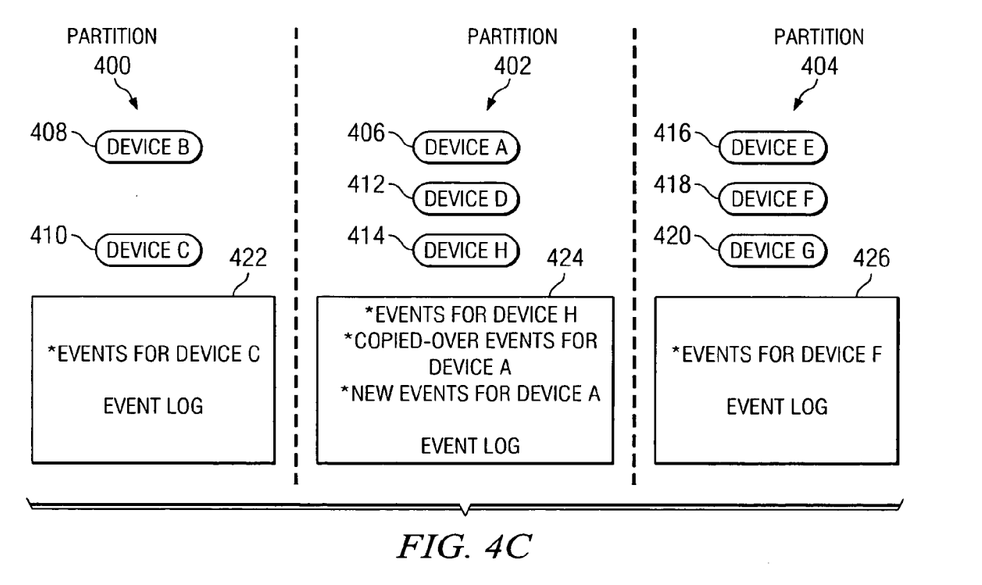

Turning now to FIGS. 4A-4C, diagrams illustrating handling of events for devices in a logical partitioned data processing system is depicted in accordance with a preferred embodiment of the present invention. In FIG. 4A, the state of a logical partitioned data processing system, such as logical partitioned data processing system 200 in FIG. 2 is shown prior to a dynamic reallocation or movement of a device.

In this illustrative example, partitions 400, 402, and 404 are present in the logical partitioned data processing system. Partition 400 contains device A 406, device B 408, and device C 410. Partition 402 contains device D 412 and device H 414. Partition 404 contains device E 416, device F 418, and device G 420. Further, each of these partitions contains an event log. An event log is also referred to as an error log in the illustrative examples. Event log 422 is contained within partition 400 and contains events for device A 406 and events for device C 410. Event log 424 is located in partition 402 and contains events for device H 414. Event log 426 is located in partition 404 and contains events for device F 418.

In FIG. 4B, device A 406 has been moved or reallocated to partition 402 from partition 400. As can be seen, events for device A 406 are still present within partition 400. Previously, these events could not be taken into account during error analysis by a diagnostics process because events for device A 406 located in event log 422 are inaccessible by a diagnostics program or process executed by partition 402 for device A 406.

In FIG. 4C, events for device A 406 located in event log 422 are copied into event log 424. In the illustrative examples this copy process is initiated and managed through a process or program on a hardware management console, such as hardware management console 300 in FIG. 3.

As a result, the events for device A 406 that occurred while device A 406 was assigned to partition 400 may now be taken into account by a diagnostics process for partition 402. The diagnostics process now may analyze events generated prior to device A 406 being moved to partition or assigned to partition 402. Event log 424 now contains events that previously occurred as well as new or current events for device A 406 that have occurred since device A 406 was moved to partition 402.

Further, some resources may have other resources attached or connected in a parent-child relationship. When this type of resource is moved from one partition to another partition, the child resources are normally required to be moved as well. Events associated with these child devices also are copied or moved, as well as the events for the parent devices into the new partition to allow for complete analysis of events by diagnostics processes.

Moreover, an identification of events from a prior partition may be made using the mechanism of the present invention. In this manner, a diagnostics process may be able to identify events that occurred in the prior partition as well as those in the current partition in making analysis.

Figure 5:
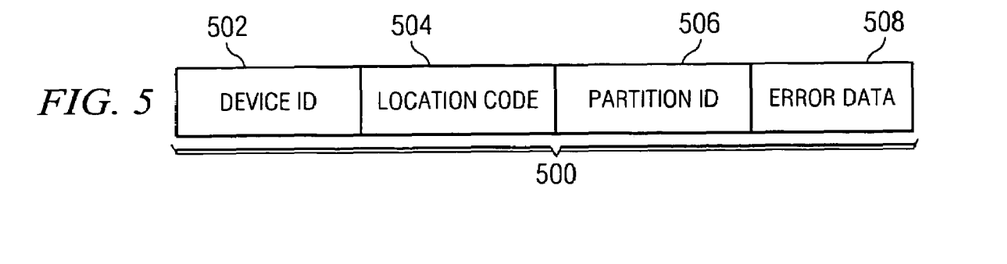
FIG. 5 is a block diagram showing an example of an event in an event log in accordance with a preferred embodiment of the present invention.

Turning now to FIG. 5, a block diagram showing an example of an event in an event log is depicted in accordance with a preferred embodiment of the present invention. Event 500 is an example entry in an event log, such as event log 422 in FIG. 4. Event 500 includes device ID 502, location code 504, partition ID 506, and error data 508. Device ID 502 is used to identify the device. In the illustrative examples, the device id used is a handle assigned to the device by the operating system. For example, a disc drive id takes the form of "hdiskx" in which x is an integer number. In another example, an Ethernet adapter device id takes the form of "entx" in which x is an integer number. Location code 504 is used to identify the location of the device within the partition. Partition ID 506 identifies the partition to which the device is assigned. Error data 508 contains data used for error analysis when an event occurs.

In accordance with an illustrative embodiment of the present invention, partition ID 506 is not changed when an event, such as event 500, is copied from one partition to another partition. In this manner, users and diagnostics programs may be able to identify events that occurred in different partitions for a particular device.

Figure 6:
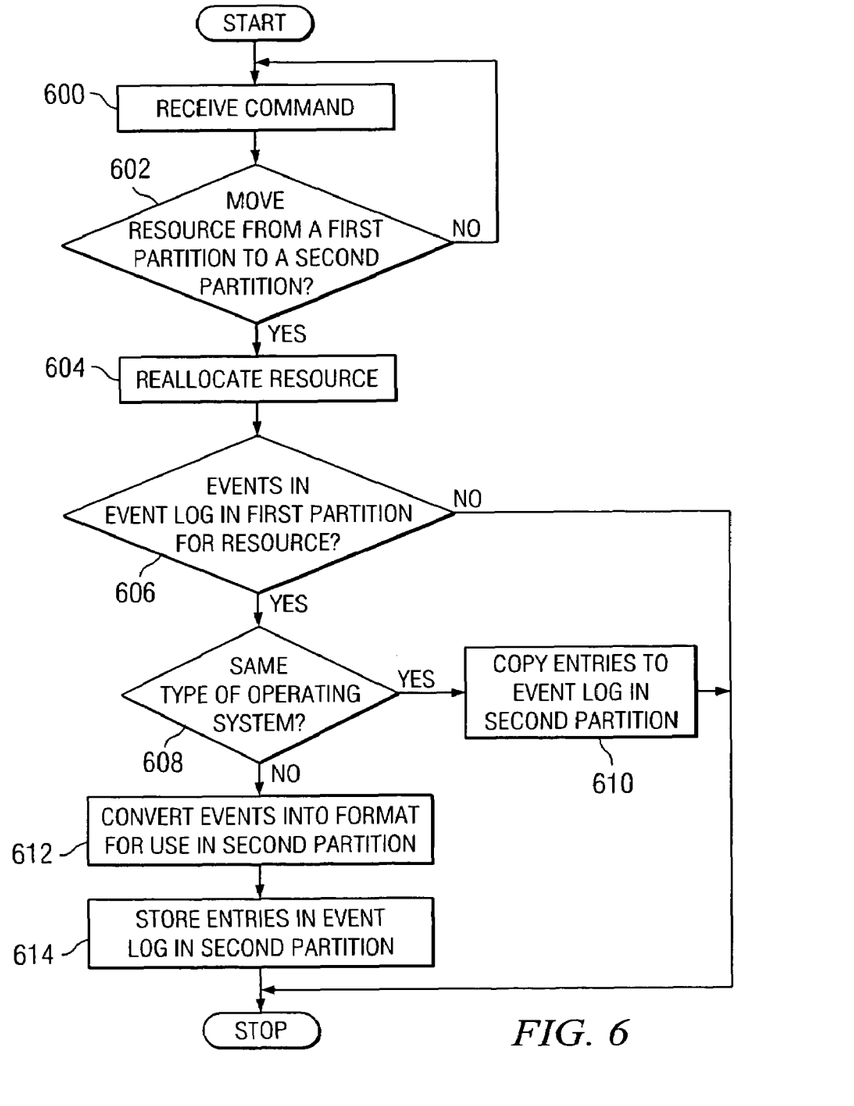
FIG. 6 is a flowchart of a process for managing events in accordance with a preferred embodiment of the present invention.

Turning next to FIG. 6, a flowchart of a process for managing events is depicted in accordance with a preferred embodiment of the present invention. The process illustrated in FIG. 6 may be implemented as part of a set of management processes in a hardware management console, such as hardware management console 300 in FIG. 3. The management processes may invoke processes in the partition to accomplish the task of copying events.

The process begins by receiving a command (step 600). A determination is made as to whether the command is to move a resource from a first partition to a second partition (step 602). If the command is to move a resource from the first partition to the second partition, the resource is then reallocated to the second partition (step 604). After reallocation of the resource, a determination is made as to whether one or more events are present in the error log in the first partition for the resource that has been moved (step 606).

If one or more events are present in the event log in the first partition, a determination is made as to whether the second partition contains the same type of operating system as the first partition (step 608). If the same type of operating system is present in both partitions, these entries or events for the resource are copied from the event log in the first partition to the event log in the second partition (step 610) with the process terminating thereafter.

Turning back to step 608, if the operating systems are different in the two partitions, one or more events are converted into a format for use by the operating system in the second partition (step 612). The converted entries are then stored in the event log in the second partition (step 614) with the process terminating thereafter.

With reference again to step 602, if a resource is not to be moved from a first partition to a second partition the process returns to step 600. In this case, the command is for some other management process, such as a monitoring process or a diagnostics process.

Thus, the present invention provides an improved method, apparatus, and computer instructions for managing events in an event log for a logical partitioned data processing system. The mechanism of the present invention provides for allowing a diagnostics process in one partition to be able to analyze events that occurred for a device when that device was previously assigned to another partition. The mechanism of the present invention copies or moves events in an event log from the prior partition into the new or current partition. In this manner, a diagnostics process may take into account prior events. Further, the mechanism of the present invention also allows for an identification of in which partition an event occurred through the use of partition IDs in the event.

Thus, in this manner, diagnostics processes that rely on thresholds may take into account events that occurred in a prior partition. As a result, errors or events that occurred in a current and former partition may cause a device to be failed since events from both partitions may now be taken into account.

Further, if heterogeneous operating systems are present, the copying of an event entry from the event log of one partition to that of another partition may involve a conversion step to convert errors or events from one format to another format to allow the target operating system to understand those entries.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing event information in a logical partitioned data processing system, the method comprising:
   reallocating a resource, in the logical partitioned data processing system, from a first partition to a second partition, wherein the first partition is managed by a first operating system and the second partition is managed by a second operating system, wherein the first operating system is different from the second operating system;
   responsive to reallocating the resource, determining whether an event for the resource is present in a first event log in the first partition; and
   responsive to the event being present, placing the event from the first event log in the first partition to a second event log in the second partition, thereby providing accurate information for diagnostic analysis of the resource.

2. The method of claim 1 further comprising:
   determining if the second operating system is of a different type than the first operating system; and
   responsive to a determination that the second operating system is of a different type than the first operating system, converting the event into a format suitable for use with the second operating system.

3. The method of claim 1, wherein the placing step comprises:
   responsive to the event being present, moving the event from the first event log to the second event log.

4. The method of claim 1, wherein the resource is at least one of a memory, a processor, a network adapter, graphics adapter, and a disk adapter.

5. The method of claim 1, wherein the event includes a device identifier, a partition identifier, and error data.

6. The method of claim 5, wherein placing of the event in the second error log occurs without changing the partition identifier, wherein a partition in which the event occurred is identified using the partition identifier.

7. A data processing system for managing event information in a logical partitioned data processing system, the data processing system comprising:
   reallocating means for reallocating a resource, in the logical partitioned data processing system, from a first partition to a second partition, wherein the first partition is managed by a first operating system and the second partition is managed by a second operating system, and wherein the first operating system is different from the second operating system;
   determining means, responsive to reallocating the resource, for determining whether an event for the resource is present in a first event log in the first partition; and
   placing means, responsive to the event being present, for placing the event from the first event log in the first partition to a second event log in the second partition, thereby providing accurate information for diagnostic analysis of the resource.

8. The data processing system of claim 7 further comprising:
   determining means for determining if the second operating system is of a different type than the first operating system; and
   converting means, responsive to a determination that the second operating system is of a different type than the first operating system, converting the event into a format suitable for use with the second operating system.

9. The data processing system of claim 7, wherein the placing means comprises:
   moving means, responsive to the event being present, for moving the event from the first event log to the second event log.

10. The data processing system of claim 7, wherein the resource is at least one of a memory, a processor, a network adapter, graphics adapter, and a disk adapter.

11. The data processing system of claim 7, wherein the event includes a device identifier, a partition identifier, and error data.

12. The data processing system of claim 11, wherein placing of the event in the second error log occurs without changing the partition identifier, wherein a partition in which the event occurred is identified using the partition identifier.

13. A computer program product in a computer recordable medium for managing event information in a logical partitioned data processing system, the computer program product comprising:
   first instructions for reallocating a resource, in the logical partitioned data processing system, from a first partition to a second partition, wherein the first partition is managed by a first operating system and the second partition is managed by a second operating system, and wherein the first operating system is different from the second operating system;
   second instructions, responsive to reallocating the resource for determining whether an event for the resource is present in a first event log in the first partition; and
   third instructions, responsive to the event being present, for placing the event from the first event log in the first partition to a second event log in the second partition, thereby providing accurate information for diagnostic analysis of the resource.

14. The computer program product of claim 13 further comprising:
   fourth instructions for determining if the second operating system is of a different type than the first operating system; and
   fifth instructions, responsive to a determination that the second operating system is of a different type than the first operating system, for converting the event into a format suitable for use with the second operating system.

15. The computer program product of claim 13, wherein the second instructions comprises:
   sub-instructions, responsive to the event being present, for moving the event from the first event log to the second event log.

16. The computer program product of claim 13, wherein the resource is at least one of a memory, a processor, a network adapter, graphics adapter, and a disk adapter.

17. The computer program product of claim 13, wherein the event includes a device identifier, a partition identifier, and error data.

18. The computer program product of claim 17, wherein placing of the event in the second error log occurs without changing the partition identifier, wherein a partition in which the event occurred is identified using the partition identifier.

19. A data processing system comprising:
   a bus system;
   a memory connected to the bus system, wherein the memory includes a set of instructions; and a processing unit connected to the bus system, wherein the processing unit executes the set of instructions to reallocate a resource, in the logical partitioned data processing system, from a first partition to a second partition, wherein the first partition is managed by a first operating system and the second partition is managed by a second operating system, and wherein the first operating system is different from the second operating system; responsive to reallocating the resource, determine whether an event for the resource is present in a first event log in the first partition; and responsive to the event being present, place the event from the first event log in the first partition to a second event log in the second partition in response to the event being present, thereby providing accurate information for diagnostic analysis of the resource.

* * * * *